3,457,002
VARIABLE MONOCHROMATOR WITH CYLINDRICAL INTERFERENCE WEDGE
Richard A. Magrath, Boston, Mass., assignor to Baird-Atomic, Inc., Cambridge, Mass., a corporation of Massachusetts
Filed Dec. 27, 1965, Ser. No. 516,262
Int. Cl. G02b 5/28
U.S. Cl. 350—166                                                    1 Claim

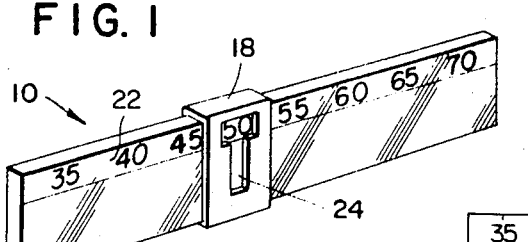
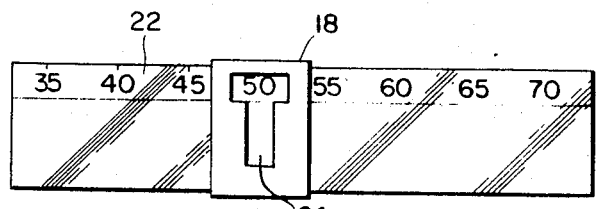
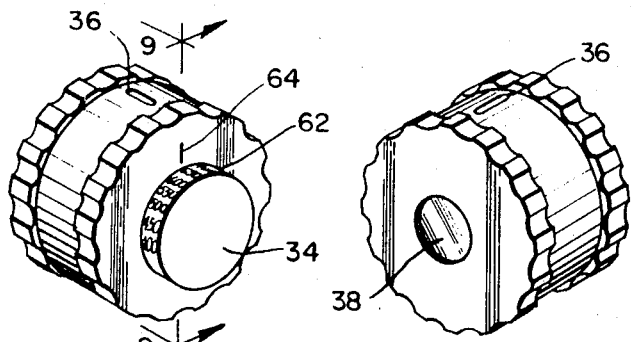
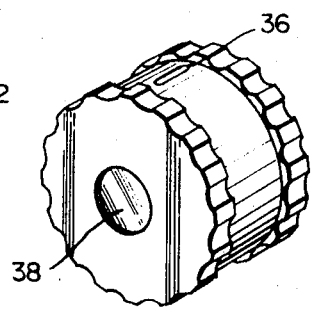
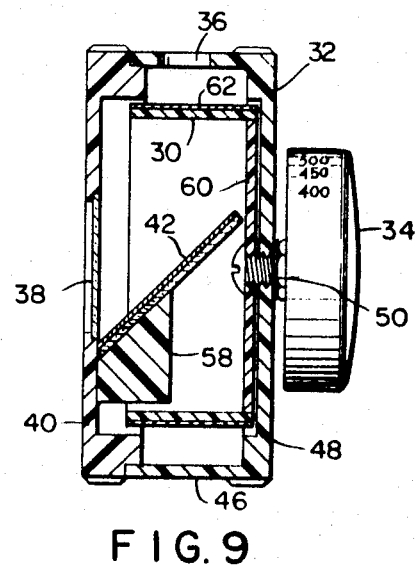
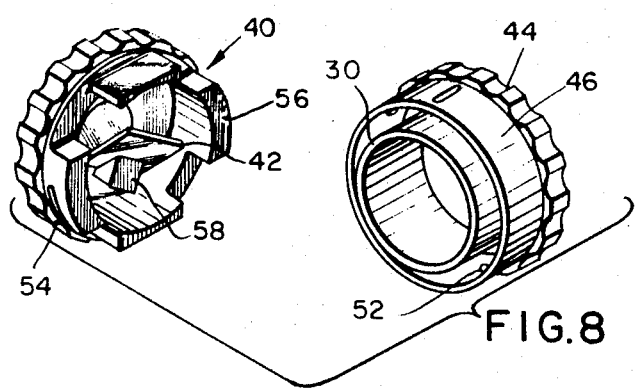
*INVENTOR.*
RICHARD A. MAGRATH
BY
Morse, Altman & Oates
ATTORNEYS United States Patent Office 3,457,002
Patented July 22, 1969

ABSTRACT OF THE DISCLOSURE

An interference filter wedge is provided with a scale indicating the wavelength passed through each portion of the wedge and an apertured member which is mounted for relative movement to the wedge whereby a selected wavelength may be passed through the aperture and the wavelength shown on the scale. In one embodiment, the wedge is disposed between a pair of flat plates with the scale provided along one margin. A slide member is mounted for movement lengthwise of the plates and is formed with a T-shaped slit which exposes the scale of that portion of the wedge in register with the slit. In another embodiment the wedge is in the form of a tubular cylinder rotatably mounted within a housing. The housing is provided with a radial slit and an axial opening with a mirror mounted within the housing for directing light through the wedge. A knob is provided for rotating the cylindrical wedge and a scale is provided on the wheel.

---

This invention relates generally to optical filtering devices and more particularly is directed towards a calibrated variable interference type filter adapted to pass bands of selected wavelengths which bands are identified by a scale coacting with a slit through which a specified wavelength will pass.

In many optical experiments, demonstrations and the like, there is a need to obtain and identify a specific optical wavelength. Optical filters for passing a narrow band of wavelengths are frequently employed in spectroscopic work, flame photometry, and numerous other applications where an isolated wavelength is required. Heretofore, a wide assortment of absorption or interference filters have been required to identify or isolate selected wavelengths from a broad spectrum. Normally, any given filter has a fixed passband characteristic which characteristic may be broad or narrow. Normally, absorption or blocking filters are characterized by relatively broad pass-band properties whereas an interference type filter can be made to transmit a very narrow band of wavelengths. Because of this quality, interference filters are used as monochromators to examine a radiation source at the wavelength of a single spectrum line.

An interference type filter wedge will pass bands of different wavelengths through different portions of the filter. While this type of filter has the ability of passing different selected wavelengths, the particular wavelength passing through any given portion is unknown and may be determined only by experiment.

Accordingly, it is an object of the present invention to provide an optical filter capable of passing a variety of different wavelengths all of which are known and indicated.

Another object of this invention is to provide a calibrated variable monochromator through which a variety of different and known wavelengths may be passed.

A further object of this invention is to provide a simple, low-cost, compact and calibrated variable monochromator.

More particularly this invention features a variable monochromator comprising an interference filter wedge and a slit, the wedge and the slit being movable relative to one another, and a scale associated with the slit and filter for representing the particular wavelength region of the wedge with respect to the slit whereby a variety of wavelengths may be observed and identified.

However, these and other features of the invention, along with further objects and advantages thereof, will become more readily apparent from the following detailed description of a preferred embodiment of the invention, with reference being made to the accompanying drawings, in which:

FIG. 1 is a view in perspective of a calibrated variable monochromator made according to the invention, FIG. 2 is a view in front elevation thereof, FIG. 3 is a sectional end view of the device, FIG. 4 is a sectional plan view of a partially assembled filter wedge, dimensions being exaggerated for the purposes of illustration, FIG. 5 is a view similar to FIG. 4 but showing a fully assembled wedge, FIG. 6 is a view in perspective of a modification of the invention, FIG. 7 is another perspective view of the FIG. 6 modification showing the opposite side thereof, FIG. 8 is an exploded perspective view of the FIG. 6 embodiment, and, FIG. 9 is a cross-sectional view taken along the lines 9—9 of FIG. 6.

Most narrow band interference filters are of the Fabry-Perot type which in its simplest form comprises a glass plate coated with a layer of silver which is covered by a layer of dielectric, in turn followed by another layer of semitransparent silver. In all wavelengths in which the dielectric layer has an optical thickness of an integral number of half-waves, the filter will have a passband. The number of half-waves, corresponding to a unit passband is called the order of the passband. Higher peak transmission and lower offpeak transmission may be obtained by multilayer interference filters. In place of the metal layers a series of dielectric layers are applied to the supporting strata. By making several layers of alternate high and low index dielectric it is possible to reinforce the reflectivity of a single boundary between two dielectric layers and build it up by multiple reflection to any desired value. It is necessary only that the layers be of such thickness that the reflections from excessive boundaries are in phase.

Where the dielectric stratum is formed in a uniform thickness over a supporting surface the pass-band characteristics of the resulting filter will be uniform throughout the filter. However, the pass-band characteristics may be made to vary from one portion of the filter to another by varying the thickness of the interferring medium from one portion of the filter to another. Such filters are known as interference filter wedges. The multi-coating layer varies in thickness over a given length causing the band-pass characteristics to vary accordingly. In FIGS. 4 and 5 a filter wedge is indicated generally by the reference character 10 and comprises upper and lower glass plates 12 and 14 respectively and a stratum 16 which is the multilayer interference coating. It will be noted that the stratum 16 varies in thickness from one end to the other of the filter and defines a vary narrow edge. It will be understood that the relative dimensions of the stratum 16 have been exaggerated for purposes of illustration. In practice, the stratum 16 would be measured in angstrom units.

The filter wedge such as shown in FIGS. 4 and 5 is formed typically by a deposition process in which the supporting plate 14 is moved progressively slower past a deposition zone so that the deposited stratum will be thicker at one end of the plate than at the other to form the wedge. After the stratum 16 is formed, the upper plate 12 is cemented over it to form a unitary structure.

Referring now more particularly to FIGS. 1 through 3, the filter wedge 10, which may be on the order of 6" or so in length and perhaps an inch or so in width, is mounted within a slide 18, the two parts being relatively moveable longitudinally. The slide 18 is in the form of a rectangular open-ended housing dimensioned to snugly receive the filter wedge 10 as shown in FIG. 3. A small leaf spring 20 provides a friction contact between the slide and the filter to prevent accidental movement between the two parts but permitting the slide to be moved manually along the filter.

In the illustrated embodiment, the filter 10 is provided with a scale 22 along its upper forward margin, the scale representing angstrom measurements. For example, the particular scale illustrated ranges from 35 to 70, these being abbreviated figures representing 3,500 A. to 7,000 A., markings being labeled at every 5,000 Angstrom separation. It will be understood that the particular number appearing along the scale corresponds with the optical pass-band characteristics of that portion of the filter wedge directly under the given figure. For example, in the illustrated embodiment the left-hand edge of the wedge 10 will pass a wavelength of 3500 A. whereas the extreme right-hand end will pass a wavelength of 7000 A. with intermediate wavelengths being marked along the scale.

The slide 18 is formed with a T-shaped opening 24 the upper portion of the opening defining a window registering with the scale 22 and the lower portion of the opening defining the slit through which the light will pass. Thus, by moving the slide to selected position along the wedge, a particular wavelength will pass through the split at the indicated wavelength. It can be immediately identified by the particular number appearing in the slide window.

The device may obviously be made to cover any portion of the visible spectrum where suitable calibrations are provided so that the wavelength passing through the slit may be quickly identified. The device provides a quick and easy means for obtaining or identifying a specific wavelength. It may be used to identify unknown filters by superimposing the unknown filter in front of the split. The wedge may be moved along the slide until the light peaks at the slit. The peak point will be the pass-band characteristic of the unknown filter which may be readily read on the scale. The device may be used for other purposes such as flame photometry wherein spectral characteristics may be observed through the slit in order to identify the presence of a particular element. Numerous other applications will also appear to those skilled in the art.

Referring more particularly to FIGS. 6 through 9, there is illustrated a modification of the invention and, in this embodiment, an interference wedge ring 30 is mounted within a housing 32 for rotation by means of an exterior knob 34. The cylindrical housing 32, which may be perhaps 3 or 4 inches in diameter, is formed with a slit opening 36 in the cylindrical wall thereof and in register with the ring 30. A circular window opening 38 is formed in the axis of the housing in line with a fixed mirror 42.

The housing 32 comprises a cover 40 and a cup portion 44 having a cylindrical wall 46 and an end wall 48 which carries the knob 34 and ring 30 by means of a shaft 50. The cup portion of the housing is formed with diametrically opposed bosses 52 for locking engagement with grooves 54 in spaced lugs 56 formed on the cover portion 40. In this fashion of two parts of the housing may be brought together and locked by rotating the cover against the cup portion.

The mirror 42 is mounted at a 45° angle with respect to the axis of the housing by means of a block 58 fixed to the inside of the cover 40. In this position the mirror reflects light between the window 38 and the split 36 through the wedge ring 30.

The wedge ring comprises a short section of a tubular cylindrical body of glass or the like carried by a circular plate 60 fixed to the shaft 50. The outer surface of the ring supports a wedge filter 62 which, in this embodiment, may comprise a stratum of interfering material deposited on a flexible transparent backing strip such as that sold under the trademark "Mylar," for example. The Mylar strip with the interfering strata may thus be cemented over and against the outer cylindrical surface of the ring. In this fashion, by rotating the ring within the housing by means of the knob 34, different portion of the ring may be brought into register with the split, the mirror and the window so that a selected wavelength may be passed therethrough. As best shown in FIG. 6 the knob 34 is provided with a scale 62 on which appears the pass-band wavelength for that portion of the ring appearing at the slit 36. Thus, by rotating the knob to a selected position opposite indicia 64, the corresponding filter section for that wavelength will register with the slit 36.

The unit shown in FIGS. 6 through 9 thus serves the same function as the principal embodiment in that it may be adjusted to pass any selected and identified wavelength within the range of the wedge filter. By detachably mounting the ring and knob within the housing sets of different rings and knobs, each having a different range of pass-bands, may be employed with a single housing. Thus a single unit may be employed to cover the visible spectrum.

Having thus described the invention, what I claim and desire to obtain by Letters Patent of the United States is:
1. A variable monochromator, comprising
   (a) a tubular cylindrical interference filter wedge continuous throughout its extent,
   (b) a housing enclosing said wedge,
   (c) said housing being formed with a pair of openings therethrough one radial to said wedge and the other axial thereto, at least one of said openings being in the form of a slit said wedge being rotatable within said housing about an axis aligned with said axial opening,
   (d) reflecting means optically aligned with a portion of said wedge and both of said openings mounted in said housing for directing light passing in through one of said openings, through said portion of said wedge and out through the other opening,
   (e) knob means exterior of said housing and drivingly connected to said wedge for rotating said wedge,
   (f) a visible scale associated with said knob means for indicating the passband characteristic of that portion of the wedge in register with said openings.

References Cited
UNITED STATES PATENTS

| | | | |
|---|---|---|---|
| 2,406,318 | 8/1946 | Brace | 350—315 X |
| 2,708,389 | 5/1955 | Kavanagh | 350—166 |
| 2,734,991 | 2/1956 | Shapiro. | |
| 3,334,956 | 8/1967 | Staunton | 350—166 X |

FOREIGN PATENTS 1,314,569  12/1962  France.

DAVID SCHONBERG, Primary Examiner

T. H. KUSMER, Assistant Examiner

U.S. Cl. X.R.

356—100